No. 861,890. PATENTED JULY 30, 1907.
S. A. PHILIPS.
SAWING MACHINE.
APPLICATION FILED APR. 25, 1907.
2 SHEETS—SHEET 1.
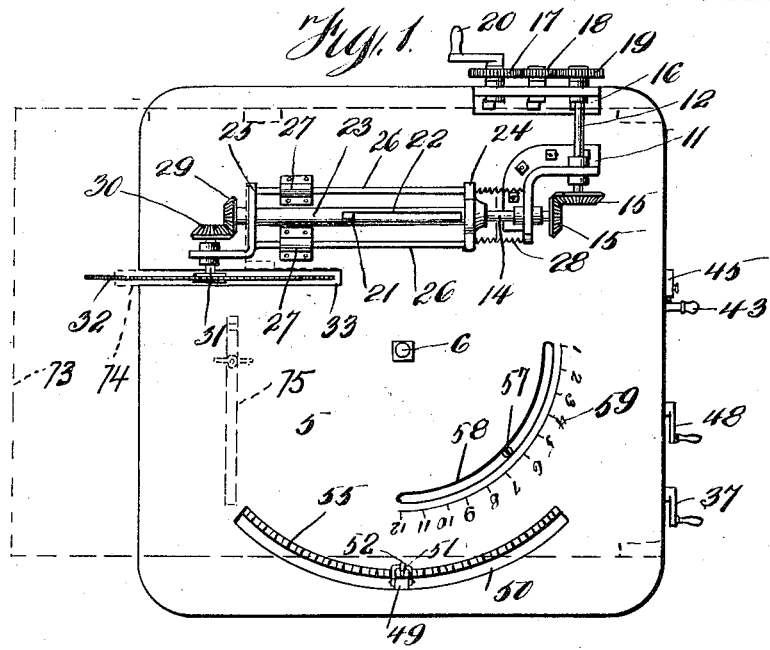
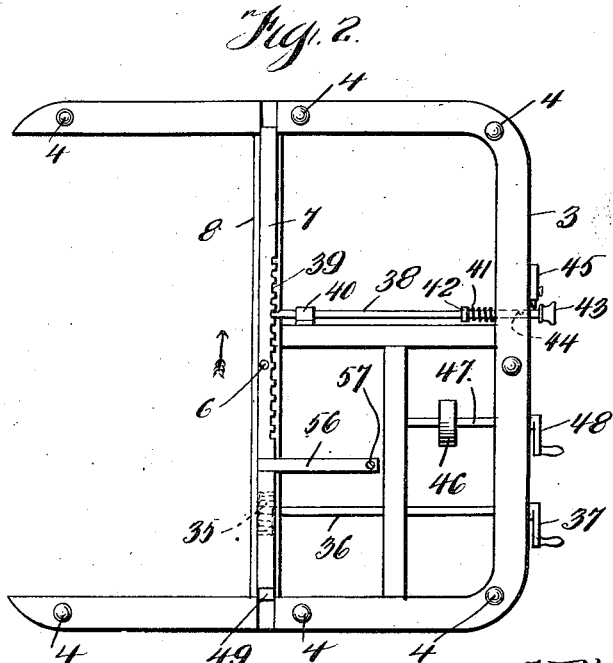
WITNESSES:
Samuel Payne
R. H. Butler
INVENTOR
S. A. Philips.
BY H. C. Everitt Co.
Attorneys No. 861,890. PATENTED JULY 30, 1907.
S. A. PHILIPS.
SAWING MACHINE.
APPLICATION FILED APR. 25, 1907.
2 SHEETS—SHEET 2.
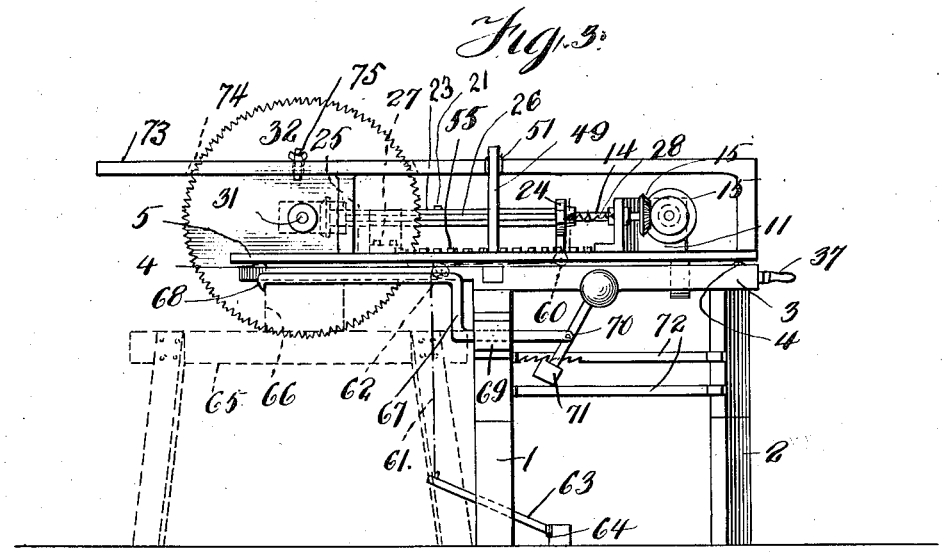
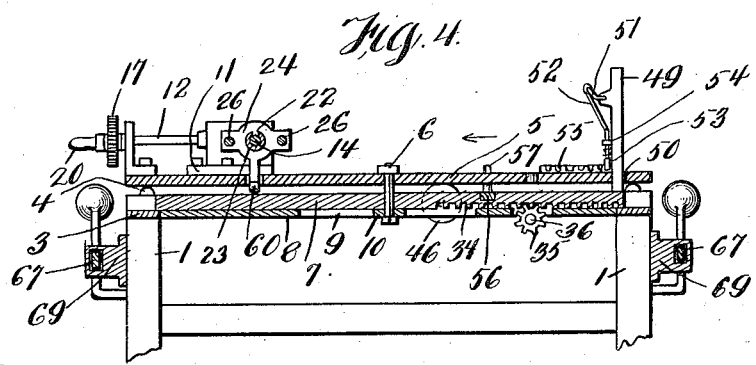
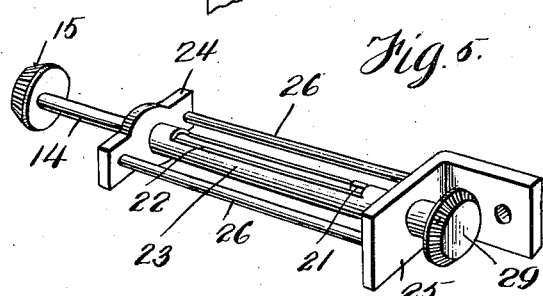
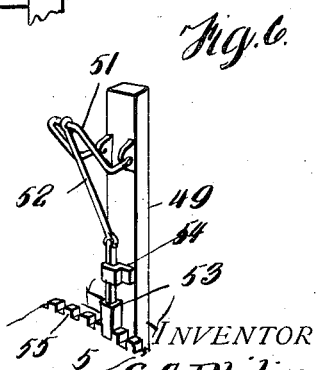

UNITED STATES PATENT OFFICE.

SAMUEL A. PHILIPS, OF WEST ELIZABETH, PENNSYLVANIA.

SAWING-MACHINE.

No. 861,890.   Specification of Letters Patent.   Patented July 30, 1907.

Application filed April 25, 1907. Serial No. 370,219.

*To all whom it may concern:*

Be it known that I, SAMUEL A. PHILIPS, a citizen of the United States of America, residing at West Elizabeth, in the county of Allegheny and State of Pennsylvania, have invented certain new and useful Improvements in Sawing-Machines, of which the following is a specification, reference being had therein to the accompanying drawing.

This invention relates to sawing machines, and the invention has for its object to provide a novel rotary saw that can be easily and quickly adjusted to sever a piece of timber at any desired angle, without shifting the piece of timber at an angle to the sawing machine.

My invention aims to provide a novel machine for cutting large pieces of timber, the machine being particularly adapted for cutting joists and timber used in constructing stair ways. To this end, I have devised a rotary saw that can be easily and quickly positioned at any desired angle with relation to a piece of work, the saw being readily adjusted to insure perfect accuracy of a kerf being formed in a piece of work.

In constructing my improved machine, I have aimed to dispense with the labor and time heretofore necessary for shifting pieces of timber before the machine, in order that they may be properly cut, the machine being of a portable nature and can be operated either by hand or from a suitable source of energy.

With the above and other objects in view, which will more readily appear as the invention is better understood, the same consists in the novel construction, combination and arrangement of parts to be hereinafter more fully described and then specifically pointed out in the appended claims.

Referring to the drawing forming part of this specification, like numerals of reference designate corresponding parts in all the figures of the drawings.

Figure 1 is a plan of my improved machine, Fig. 2 is a plan of the frame work thereof, Fig. 3 is a side elevation of the machine, Fig. 4 is a cross sectional view of the same, partly broken away, Fig. 5 is a perspective view of a telescopic shaft used in connection with the machine, Fig. 6 is a perspective view of a table locking device used in connection with the machine.

To put my invention into practice, I construct my improved machine of standards or legs 1 and 2, said standards or legs supporting a horizontal frame work 3, which is provided with ball bearings 4 for a table 5, said table being pivotally mounted upon the frame work by a king bolt 6, said bolt passing through a movable rack 7 slidably mounted in a transverse brace 8 of the frame work, said brace being slotted as at 9 to accommodate a block 10 carried by the king bolt 6. Upon the table 5 is secured an angular bearing 11 for shafts 12 and 14, the converging ends of said shafts being provided with meshing beveled gear wheels 15. The end of the shaft 11 extends to the edge of the table 5 and is journaled in a bracket 16 carried by said table. The bracket 16 also forms a bearing for meshing spur wheels 17 and 18, the latter meshing with a spur wheel 19 mounted upon the end of the shaft 12. The spur wheel 17 can be driven by a crank handle 20 or from a suitable source of energy.

The end of the shaft 14 is provided with a T-shaped head 21 engaging in longitudinally disposed slots 22 formed in the tubular shaft 23, said shaft being journaled in brackets 24 and 25 having guide rods 26, slidably mounted in bearings 27 carried by the table 5. The bracket 24 is connected by coiled springs 28 to a bearing 11 whereby the tubular shaft 23 will be normally held in the position illustrated in Fig. 1 of the drawings. The outer end of the tubular shaft 26 is provided with a beveled gear wheel 29, meshing with a similar gear wheel 30 carried by a shaft 31 journaled in the bracket 25 said shaft being provided with a circular saw 32 which extends into a slot 33 formed in the table 5. The mechanism just described constitutes means for revolving the circular saw 32 of my improved machine, also means for adjusting the same within the slot 33 of the table.

The rack 7 upon its under side is provided with teeth 34 and meshing with said teeth is a pinion 35 carried by a shaft 36 journaled in the frame work 3, the end of the shaft being provided with a suitable crank handle 37. By rotating the crank handle 37, the table 5 can be shifted back and forth upon the frame work 3 of the machine. To prevent the table from being accidentally shifted, I employ a rod 38 adapted to engage the teeth 39 of the rack 7, said rod being slidably mounted in a bracket 40 and in the frame work 3 of the machine. The rod 38 is normally held in engagement with the rack 7 by a coiled spring 41 interposed between the frame work 3 and the collar 42 mounted upon the rod 38. The outer end of the rod 38 is provided with a knob 43 and with a notch 44. A conventional form of latch 45 is secured to the front edge of the frame work 3 to engage in the notch 44 and hold the rod 38 out of engagement with the rack 7.

The table 5 is rotated upon the frame work 3 of the machine by a friction wheel 46 engaging the under side of the table, said wheel being mounted upon a shaft 47 journaled in the frame work 3, said shaft being provided with a crank handle 48. To hold the table in a fixed position whereby it cannot be revolved, I provide the end of the rack 7 with a post 49, said post extending upwardly through a segment shaped slot 50 formed in the table 5. The upper end of the post 49 is provided with a pivoted yoke 51, and connected to said yoke by a link 52 is a dog 53 slidably mounted in a bracket 54 carried by the post 49. The dog 53 is adapted to engage in a segment shaped rack 55 carried by the table 5 at the edge of the slot 50.

In order that the angle at which the revoluble table 5 is placed with relation to the frame work 3, can be easily determined, I provide the rack 7 with an arm 56 carrying a pin 57 that extends upwardly through a segment-shaped slot 58 formed in the table 5. The edge of the slot 58 is graduated as at 59 whereby the pin 57 will indicate the number of degrees at which the table 5 is positioned. In order that the circular saw 32 can be easily adjusted, I slot the table 5 beneath the shaft 23 and provide the bracket 24 with a depending lug 60, to which is attached a cable 61 passing over a pulley 62 journaled beneath the table. The end of the cable 61 is connected to a treadle 63 pivotally mounted as at 64, beneath the table.

In Fig. 3 of the drawings, I have illustrated trestles 65 or a suitable support for a piece of timber or work 66 to be operated upon, and to hold a piece of timber in position, while being severed or cut by the saw 32, I employ two arms 67 said arms having hook-shaped ends 68 to engage the outer side of the piece of timber 66. The arms 67 are loosely mounted in brackets 69 carried by the legs or standards 1 and pivotally connected to said arms, as at 70, are weighted pawls 71, said pawls engaging toothed bars 72 arranged between the standards 1 and 2. This mechanism just described constitutes means for holding a piece of timber in position while being operated upon by the circular saw 32.

To permit of small pieces of timber being cut by my improved machine, I provide the table with an elevated platform 73 having a slot 74 formed therein to receive the saw 32. The platform is provided with an adjustable guide strip 75, for holding pieces of material while being operated upon by the saw 32. The elevated platform can be dispensed with where the machine is used entirely for cutting heavy timbers.

From the foregoing description taken in connection with the drawings, it will be observed that I have devised a novel machine having a rotary saw that can be positioned at any desired angle with relation to a piece of work, whereby a desired kerf can be cut in the piece of work. In providing the revoluble table 5 which can also be adjusted transversely of the frame work 3, I dispense with the shifting of the piece of timber or work to be operated upon, it being only necessary to place the timber in position upon the trestles or support 65, grip the same with the arms 67 and then adjust the table 5, and the circular saw whereby a desired kerf will be cut in the piece of timber or work.

I do not care to confine myself to the specific construction of the machine, as disclosed in the drawings, as such changes in the minor details of construction, as are permissible by the appended claims, may be resorted to without departing from the spirit and scope of the invention.

What I claim and desire to secure by Letters Patent, is:—

1. A sawing machine embodying a frame work, a rack slidably mounted upon said frame work, a ball bearing table pivotally connected to said rack, an elevated platform carried by said table, said table having slots formed therein, a spring held telescopic shaft journaled upon said table, a circular saw driven by said shaft, a pinion engaging said rack for laterally adjusting said table, a spring-held rod engaging said rack for holding the rack in a fixed position, a friction wheel journaled in said frame work for revolving said table, a post carried by said rack and extending through one of the slots of said table, a movable dog carried by said post and engaging in said table to prevent said table from revolving, gripping arms loosely carried by the frame work of said table for engaging a piece of timber, means to drive said telescopic shaft, means located beneath said table for advancing said circular saw, means for holding said rod out of engagement with said rack, and means for indicating the angularity of the table with respect to its supporting frame work.

2. A sawing machine embodying a frame work, a movable rack carried thereby, a ball bearing table pivotally connected to said rack, a telescopic shaft carried by said table, a circular saw driven by said shaft, means located upon said table for driving said shaft, means located beneath said table for extending said shaft, means carried by said frame work for moving said rack, means carried by said frame work for holding said rack in a fixed position, means carried by said frame work for revolving said table, means for holding said table in a fixed position, means for indicating the angularity of said table, and clamping arms carried by said frame work for holding the piece of work.

3. A sawing machine embodying a frame work, a movable rack carried thereby, a table revolubly mounted upon said frame work and connecting with said rack, a telescopic drive shaft carried by said table, a circular saw revolved by said shaft, clamping arms carried by said frame work for engaging a piece of work, means to extend said telescopic shaft, means carried by said frame work to move said rack, means to lock said rack in a fixed position, means carried by said frame work to revolve said table, means for locking said table in a fixed position, and means for indicating the angularity of said table with relation to said frame work.

4. A sawing machine embodying a frame work, a movable rack carried thereby, a table revolubly mounted upon said frame work and connecting with said rack, a telescopic drive shaft carried by said table, a circular saw revolved by said shaft, clamping arms carried by said frame work for engaging a piece of work, means to extend said telescopic shaft, means carried by said frame work to move said rack, means to lock said rack in a fixed position, means carried by said frame work to revolve said table, means for locking said table in a fixed position.

5. A sawing machine embodying a frame work, a table revolubly mounted thereon, a telescopic drive shaft carried by said table, a circular saw driven by said shaft, means actuated from beneath said table to extend said shaft, means carried by said frame work to move said table, means carried by said frame work to lock said table in a fixed position, and means for indicating the angularity of said table with respect to said frame work.

6. A sawing machine embodying a frame work, a table movably mounted thereon, an elevated platform carried by said table, a telescopic drive shaft carried by said table, a circular saw driven by said shaft, means actuated beneath said table to extend said shaft, means carried by said frame work to laterally adjust said table, and means carried by said frame work to lock said table in a fixed position.

7. A sawing machine embodying a frame work, a table movably mounted thereon, a telescopic drive shaft carried by said table, a circular saw driven by said shaft, means actuated beneath said table to extend said shaft, means carried by said frame work to laterally adjust said table, and means carried by said frame work to lock said table in a fixed position.

8. A sawing machine embodying a frame work, a table adjustably mounted therein, a platform carried by said table, a telescopic shaft carried by said table, a saw driven by said shaft, means located beneath said table for extending said shaft, and means carried by said frame work for adjusting said table.

9. A sawing machine embodying a frame work, a table adjustably mounted therein, a telescopic shaft carried by said table, a saw driven by said shaft, means located beneath said table for extending said shaft, and means carried by said frame work for adjusting said table.

In testimony whereof I affix my signature in the presence of two witnesses.

SAMUEL A. PHILIPS.

Witnesses:
  MAX H. SROLOVITZ,
  C. V. BROOKS.